(12) United States Patent
Sato

(10) Patent No.: US 6,765,618 B1
(45) Date of Patent: Jul. 20, 2004

(54) SUBJECT SELECTION DEVICE AND IN-FOCUS PORTION INDICATING DEVICE

(75) Inventor: Koichi Sato, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 09/414,608

(22) Filed: Oct. 8, 1999

(30) Foreign Application Priority Data

Oct. 19, 1998 (JP) .......................................... P10-297194
Oct. 19, 1998 (JP) .......................................... P10-297243

(51) Int. Cl.⁷ .......................... G03B 13/00; G03B 17/00
(52) U.S. Cl. .......................... 348/348; 348/356; 396/79; 396/89
(58) Field of Search ................................ 348/345–356; 396/72, 79–82, 87–89, 125, 93, 100

(56) References Cited

U.S. PATENT DOCUMENTS

| | | | |
|---|---|---|---|
| 4,835,561 A | * 5/1989 | Matsui | 396/93 |
| 4,977,457 A | * 12/1990 | Tamekuni et al. | 348/348 |
| 5,092,670 A | * 3/1992 | Preston | 396/140 |
| 5,170,204 A | * 12/1992 | Mukai et al. | 396/296 |
| 5,485,209 A | * 1/1996 | Muramoto et al. | 348/345 |
| 5,496,106 A | * 3/1996 | Anderson | 348/678 |
| 5,694,203 A | * 12/1997 | Ogawa | 348/348 |
| 5,705,837 A | * 1/1998 | Tanigawa et al. | 348/314 |
| 5,890,021 A | * 3/1999 | Onoda | 396/121 |
| 6,144,366 A | * 11/2000 | Numazaki et al. | 345/156 |

FOREIGN PATENT DOCUMENTS

| | | | | |
|---|---|---|---|---|
| JP | 10142490 | | 5/1998 | |
| JP | 10-142490 | * | 5/1998 | .......... H04N/5/232 |

* cited by examiner

*Primary Examiner*—Andrew Christensen
*Assistant Examiner*—Nhan Tran
(74) *Attorney, Agent, or Firm*—Greenblum & Bernstein P.L.C.

(57) ABSTRACT

A subject selection device comprises a light source and an imaging device, such as a CCD, having a plurality of photo-diodes. The light source radiates a distance measuring light beam toward a plurality of objects. A reflected light beam, generated by the objects due to the distance measuring light beam, is received by the, photo-diodes. A signal charge is integrated in each of the photo-diodes, so that three-dimensional information, which includes distances from the camera to each point on a surface of the objects, is obtained. A histogram indicating a distribution of the distances is generated. Based on a peak value of the histogram, a subject to be photographed is selected from the objects. An in-focus portion indicating device indicates a portion of the subject, which is in focus, based on the peak value.

22 Claims, 11 Drawing Sheets

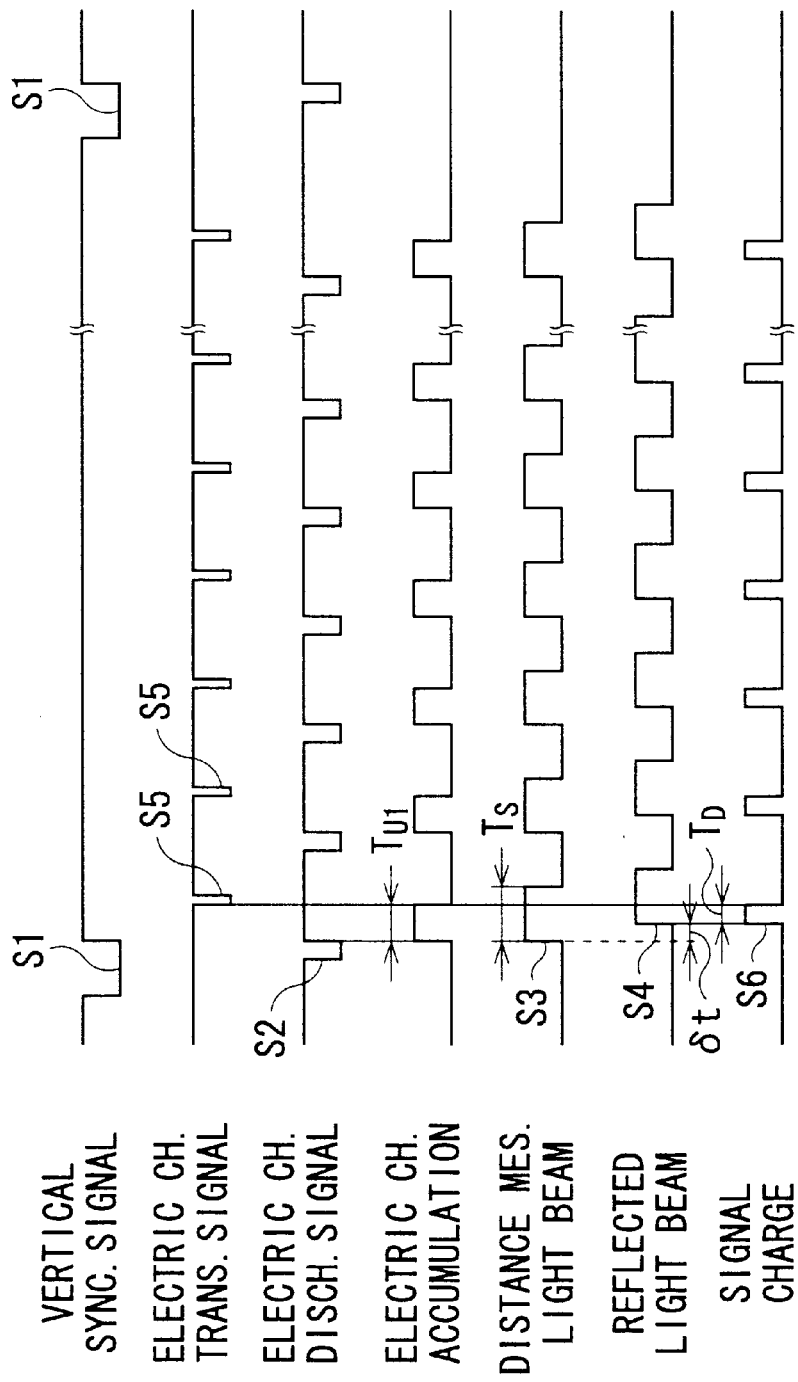

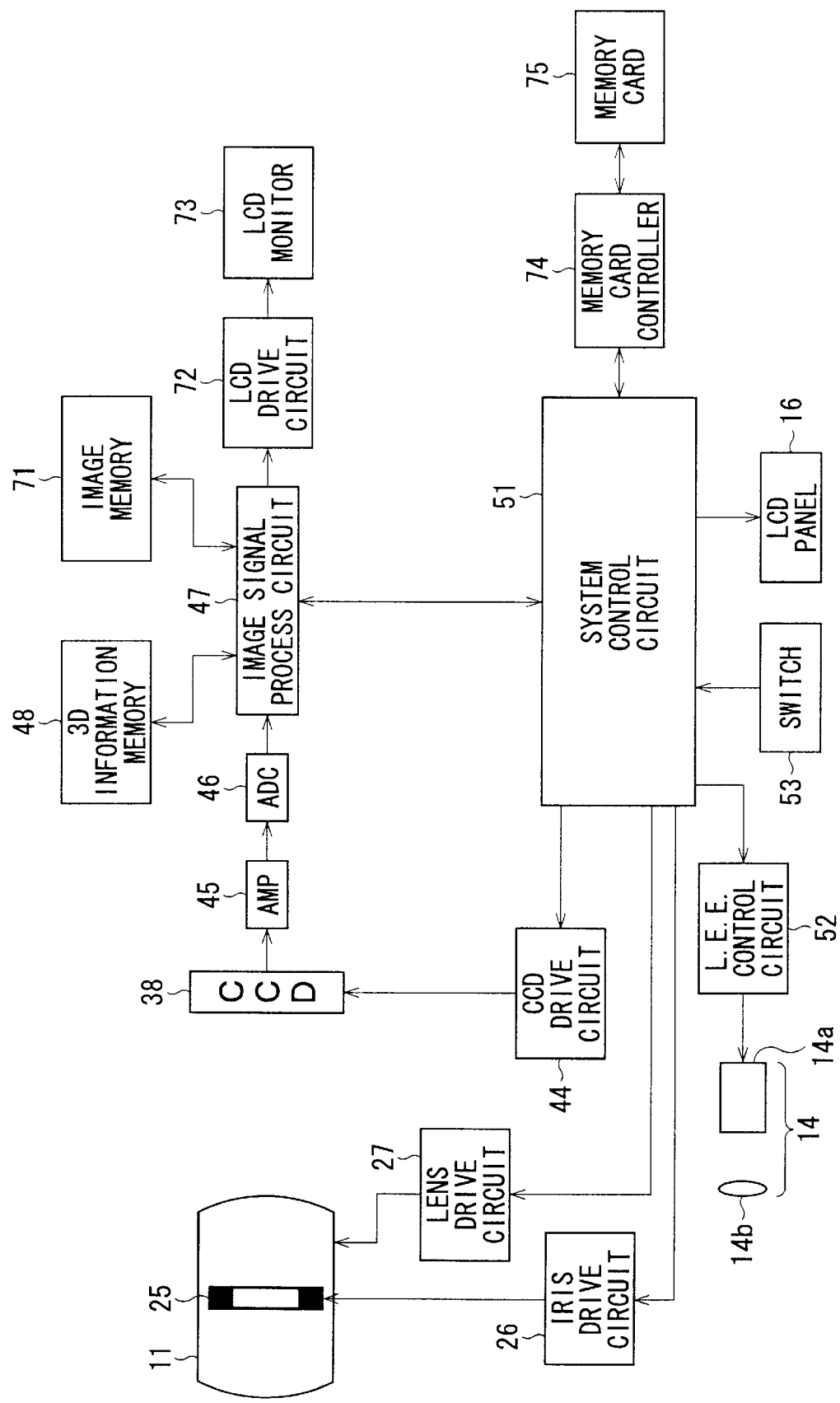

SUBJECT SELECTION DEVICE AND IN-FOCUS PORTION INDICATING DEVICE

BACKGROUND OF THE INVENTION

1. Field of the Invention

The present invention relates to a device by which a subject, a photography condition of which should be adjusted, is selected from a plurality of objects contained in an image to be photographed, and by which a subject, which is in focus, is indicated in a viewfinder.

2. Description of the Related Art

In a photographing operation, a case may occur in which, two people, for example, are contained in an image observed through a viewfinder, however, the photographer wants to focus only on the front person, or in which the photographer wants to prevent an under-exposure of the subject which may be caused by an over-brightness of the background of the subject due to a rear light. The former case can be resolved using a focus lock, in which an in-focus condition is obtained while the camera is directed to the front person so that the front person is positioned at the center of the viewfinder frame, and then the camera is returned to the original direction to perform a shutter release. The latter case can be resolved by a rear light correction in which an exposure correction switch, provided on the camera, is operated so that an exposure of the subject image is corrected.

However, the operations of the focus lock and the rear light correction are not simple, and require a skill to some extent.

On the other hand, in a photographing operation using a single-lens reflex camera, for example, a focusing adjustment is usually carried out to an image positioned at the center of the viewfinder frame. However, since opening degrees of the aperture, i.e. a depth of field, when observing via the viewfinder frame and when performing a shutter release, are different from each other, it is difficult to recognize which area will be in focus in the taken picture, by only observing via the viewfinder frame. Therefore, conventionally, a camera is known which has a pre-view function, in which an opening degree of the aperture is changed, by operating a pre-view lever, to the amount used in the photographing operation, so that the depth of field can be observed through the viewfinder frame.

However, in the pre-view operation, since the opening degree of the aperture may be small, depending upon the brightness of the subject, the viewfinder frame may become too dark to see, and thus, it may be difficult to check the depth of field with a high accuracy.

SUMMARY OF THE INVENTION

Therefore, an object of the present invention is to provide a subject selection device, which selects a subject, for which a focus lock or a rear light correction is performed, and thus the operation, such as the focus lock and the rear light correction, can be carried out easily.

According to the present invention, there is provided a subject selection device for a camera, the device comprising a light source, an imaging device, a three-dimensional information sensing processor, a histogram generating processor and a subject selection processor.

The light source radiates a distance measuring light beam toward a plurality of objects to be photographed. Each of the objects reflects the distance measuring light beam to generate a reflected light beam. The imaging device has a plurality of photoelectric conversion elements that receive the reflected light beam, so that signal charge corresponding to an amount of the received reflected light beam is accumulated in each of the photoelectric conversion elements. The three-dimensional information sensing processor integrates the signal charge in each of the photoelectric conversion elements, whereby three-dimensional information indicating distances from the camera to points on a surface of each of the objects is obtained. The histogram generating processor generates a histogram indicating a distribution of the distances. The subject selection processor selects, based on the histogram, a subject, of which a photography condition should be adjusted, from the objects.

Further, according to the present invention, there is provided an in-focus portion indicating device for a camera, the device comprising a light source, an imaging device, a three-dimensional information sensing processor, a histogram generating processor and an in-focus portion indication processor.

The light source radiates a distance measuring light beam toward an object to be photographed, the object reflecting the distance measuring light beam to generate a reflected light beam. The imaging device has a plurality of photoelectric conversion elements that receive the reflected light beam, so that signal charge corresponding to an amount of the received reflected light beam is accumulated in each of the photoelectric conversion elements. The three-dimensional information sensing processor integrates the signal charge in each of the photoelectric conversion elements, whereby three-dimensional information indicating distances from the camera to points on a surface of the object is obtained. The histogram generating processor generates a histogram indicating a distribution of the distances. The in-focus portion indication processor indicates an in-focus portion of the object, based on a depth of field of the object and the histogram.

BRIEF DESCRIPTION OF THE DRAWINGS

The objects and advantages of the present invention will be better understood from the following description, with reference to the accompanying drawings in which:

FIG. 7 is timing chart of a distance information sensing operation by which data, corresponding to a distance from a camera body to each point on a surface of subject, is sensed;

FIG. 11 is a block diagram showing an electrical construction of a digital camera to which a second embodiment of the present invention is applied.

DESCRIPTION OF THE PREFERRED EMBODIMENTS

Figure 1:
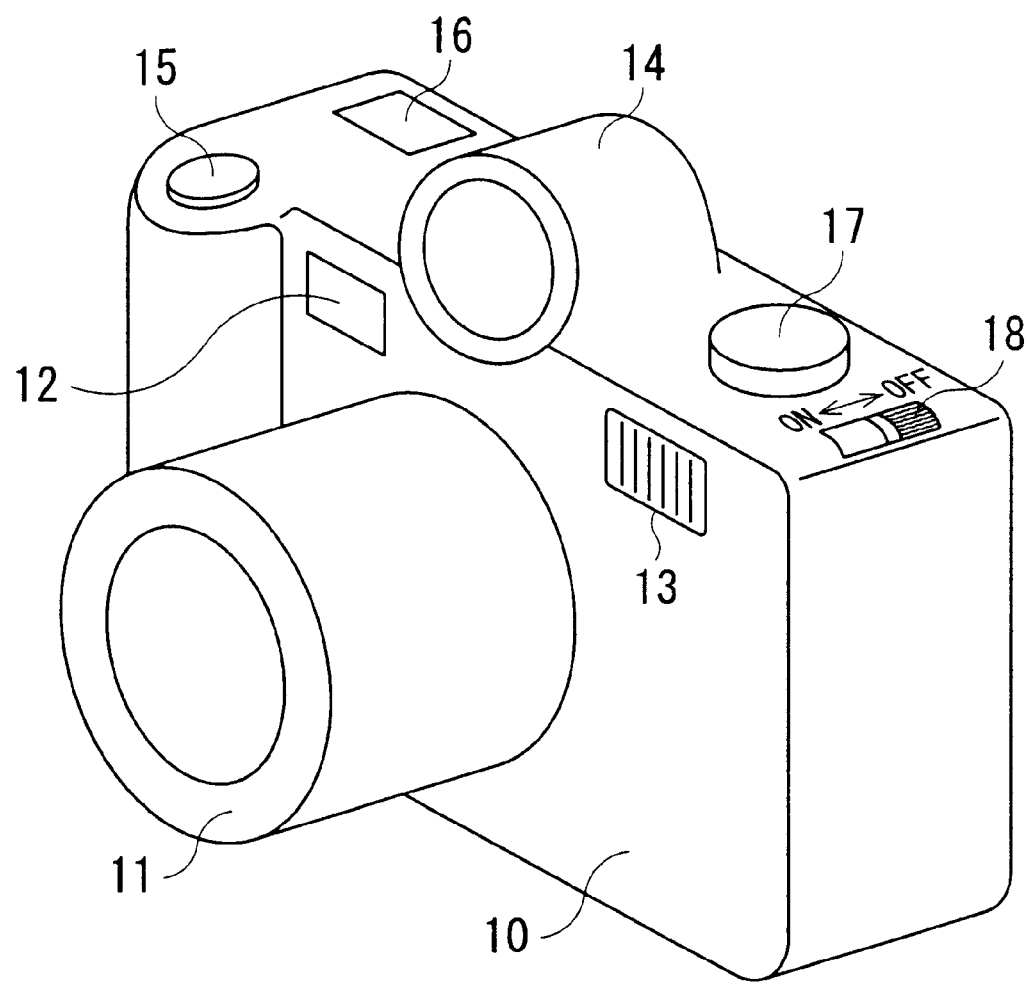
FIG. 1 is a perspective view showing a camera to which a first embodiment of the present invention is applied.

The present invention will be described below with reference to the embodiment shown in the drawings.

FIG. 1 is a perspective view of a camera to which a first embodiment of the present invention is applied.

On a front surface of a camera body 101 a viewfinder window 12 is provided toward an upper-left corner, adjacent to a photographing lens 11, and an electronic flash 13 is disposed toward an upper-right corner. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a manual selection switch 18 are provided on a right side of the device 14. The mode change dial 17 is provided for changing a photographing operation mode among an aperture priority mode, a shutter speed priority mode, a program photographing mode and so on. The manual selection switch 18 is provided for manually selecting a subject for which a focusing operation should be performed.

Figure 2:
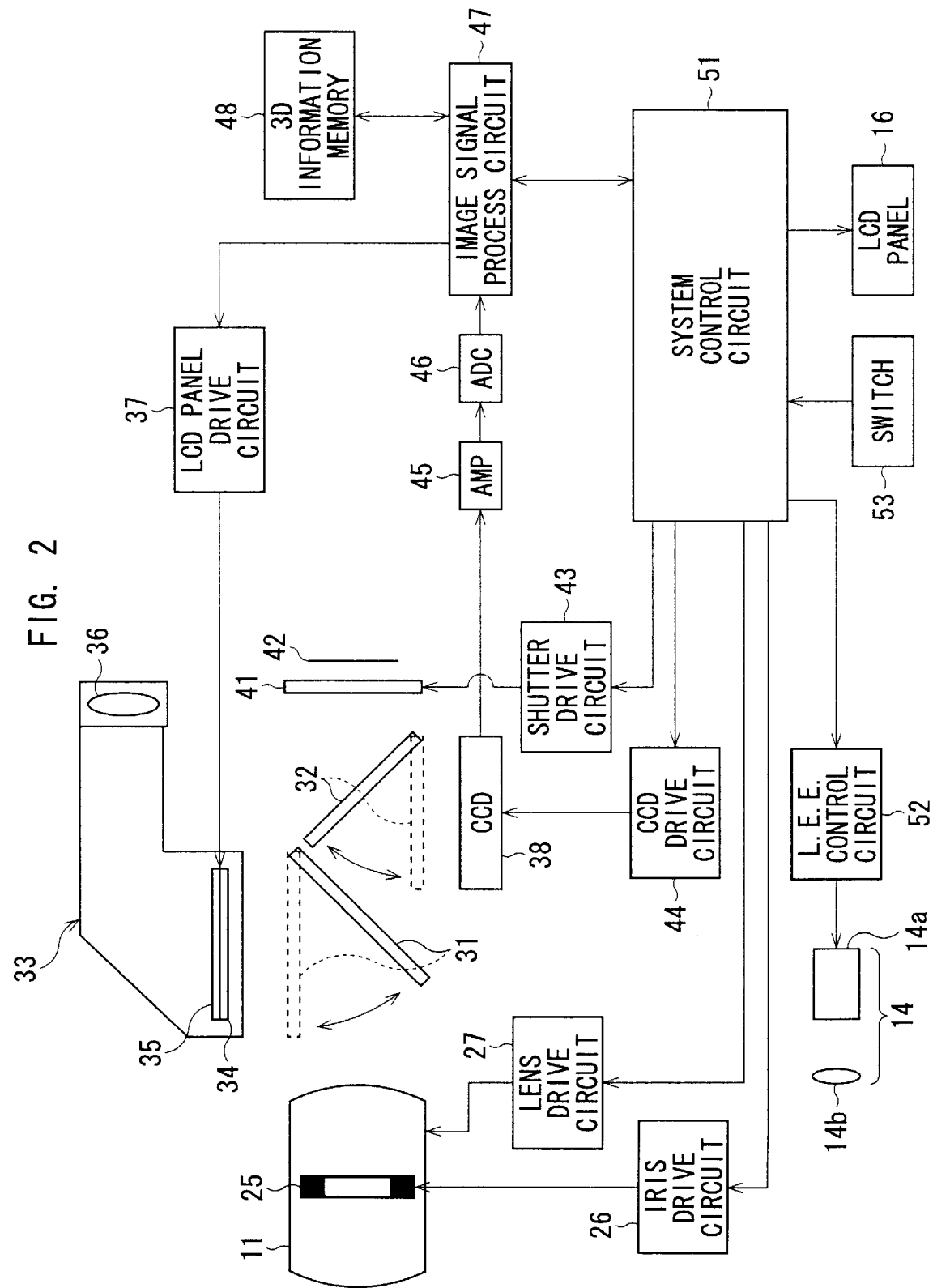
FIG. 2 is a block diagram showing an electrical construction of the camera shown in FIG. 1.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

A first mirror 31 is disposed behind (rightward in the drawing) the photographing lens 11, and a second mirror 32 is disposed behind the first mirror 31. The first mirror 31 is a half-mirror and the second mirror 32 is a total reflecting mirror. Each of the mirrors 31 and 32 can be rotated between an inclined position shown by a solid line and a horizontal position shown by a broken line.

A viewfinder 33 is provided above the first mirror 31, and is provided with a focusing glass 34, a liquid crystal display panel 35 and an eyepiece lens 36. The liquid crystal display panel 35 is laid on top of the focusing glass 34 and both are disposed to face the first mirror 31 when it is set to the horizontal position. The eyepiece lens 36 is provided at an opposite end of the viewfinder 33 to the focusing glass 34 and the liquid crystal display panel 35.

The liquid crystal display panel 35 is controlled by a liquid crystal display panel drive circuit 37, so that each liquid crystal cell provided in the liquid crystal display panel 35 is independently changed between a transparent condition, under which a light beam can pass through the cell, and an opaque condition, under which the pass of a light beam through the cell is restricted. When the first mirror 31 is in the inclined position, an image obtained through the photographing lens 11 is formed on the focusing glass 34. In the image, a portion, corresponding to the transparent area of the liquid crystal display panel 35, can be clearly observed through the eyepiece lens 36, and a portion, corresponding to the opaque area of the liquid crystal display panel 35, can be observed as a dark image through the eyepiece lens 36. Conversely, when the first mirror 31 is in the horizontal position, no image is formed on the focusing glass 34. Note that, as described later, the liquid crystal display panel 37 is controlled by an image signal process circuit 47 based on a distance measurement.

An imaging device (CCD) 38 is provided under the second mirror 32, behind which a shutter 41 is disposed. A film 42 for recording a photographed image is provided behind the shutter 41. The CCD 38 can sense a one frame image obtained through the photographing lens 11, i.e. an image identical to that led to the film 42. The CCD 38 is used for performing a distance measurement. Namely, when the second mirror 32 is in the inclined position, an image obtained by the photographing lens 11 is formed on the CCD 38, and the distance measurement is performed using the image, so that three-dimensional information indicating distances from the camera to points on a surface of each of the objects, included in the image, is obtained. Conversely, when the second mirror 32 is in the horizontal position, a light beam, passing through the photographing lens 11, is led to the film 42 by opening the shutter 41, so that the image is recorded on the film 42. The opening and closing movement of the shutter is controlled by a shutter drive circuit 43.

A luminous-flux emitting element control circuit 52 is connected to a system control circuit 51. The light emitting device 14 is provided with a luminous-flux emitting element 14a and an illumination lens 14b, and an operation of the luminous-flux emitting element 14a is controlled by the luminous-flux emitting element control circuit 52. The luminous-flux emitting element 14a radiates a laser beam, which is a distance measuring light beam, and which irradiates a whole of each of the objects through the illumination lens 14b. The laser beam, after being reflected by the objects, becomes incident on the photographing lens 11. By detecting the reflected laser beam with the CCD 38 provided with a plurality of photo-diodes, which are two-dimensionally disposed on a surface thereof, a distance measurement is performed.

In the distance measurement, an electric charge corresponding to an amount of received reflected laser beam is generated in each of the photo-diodes. An operation, such as an accumulating operation and a reading operation of the electric charge of the CCD 38, is controlled by a CCD drive circuit 44. An electric charge signal, i.e., an image signal, read from the CCD 38 is amplified by an amplifier 45, and is converted from an analog signal to a digital signal by an A/D converter 46. The digital image signal is subjected to a process, such as a noise reduction, in the image signal process circuit 47, and is stored in a three-dimensional information memory 48.

The iris drive circuit 26, the lens drive circuit 27, the shutter drive circuit 43, the CCD drive circuit 44 and the image signal process circuit 47 are controlled by the system control circuit 51. A switch group 53 having the release switch 15 (FIG. 1), the mode change dial 17 (FIG. 1) and the manual selection switch 18 (FIG. 1), and the liquid crystal display panel 16 for indicating a photographing operation mode of the camera, are connected to the system control circuit 51.

Figure 3:
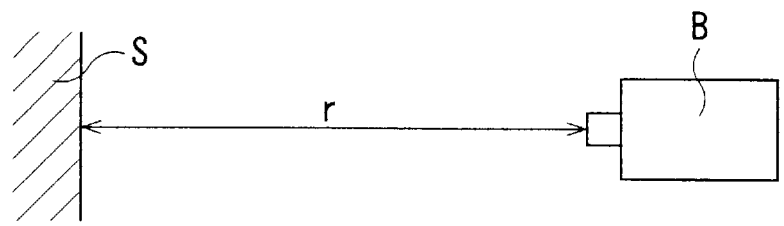
FIG. 3 is a view showing a principle behind a distance measurement.
Figure 4:
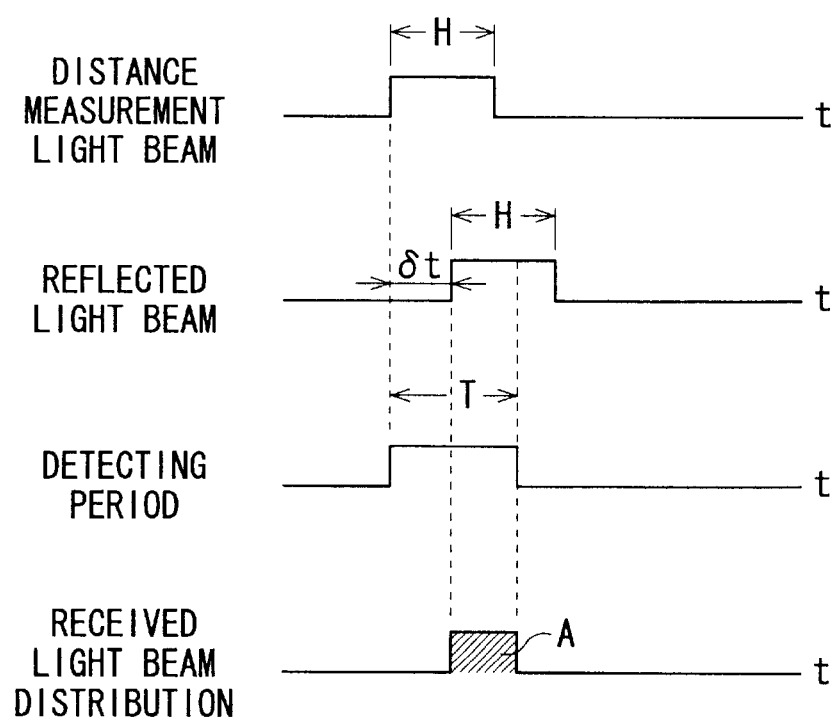
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a subject S, and the reflected distance measuring light beam is sensed by a CCD (not shown). The distance measuring light beam is a pulse, a width of which is "H". Accordingly, the reflected light beam is a pulse, a width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the subject S, the distance "r" is represented as follows:

$$r = \delta \cdot t \cdot C/2 \quad (1)$$

wherein "C" is the velocity of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r"(or the greater the time δ·t), the less the received light amount A. Note that a distance which can be sensed by the distance measurement device is restricted due to a sensitivity of the sensor provided in the device. Therefore, the reflected light beam detecting period T is determined by the maximum delay time δmax·t, which is dependent upon the distance which can be sensed, and the breadth of the pulse.

In the embodiment, by taking advantage of the principle described above, the received light amount A is sensed using each of the photo-diodes (photoelectric conversion elements) of the CCD 38, the distance from the camera body 10 to each point on the surface of the subject S is sensed, and data of the three-dimensional image, which indicates a topography of the subject S, can be obtained concurrently.

Figure 5:
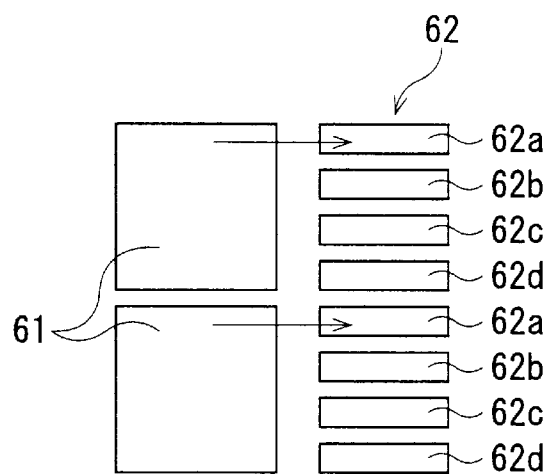
FIG. 5 is a plan view showing a disposition of photodiodes and a vertical transfer unit, which are provided in the CCD.
Figure 6:
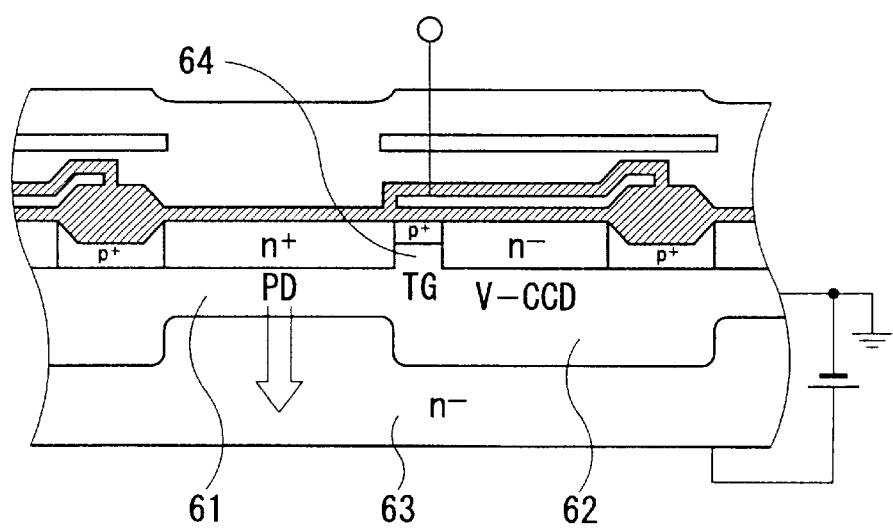
FIG. 6 is a sectioned elevational view of the CCD.

FIG. 5 is a plan view showing a disposition of the photo-diodes 61 and a vertical transfer unit 62, which are provided in the CCD 38. Actually, a multitude of photo-diodes 61 are arranged in a matrix, and a corresponding vertical transfer unit 62 is disposed beside each vertical column of photo-diodes 61. FIG. 6 is a sectioned elevational view of the CCD 38 in which the CCD 38 is cut in a plane perpendicular to a substrate 63. The CCD 38 is an interline CCD of vertical overflow drain (VOD) type in which unwanted charge is discharged to the substrate 63.

The photo-diodes 61 and the vertical transfer unit (signal charge holding unit) 62 are formed along a surface of the n-type substrate 63. A plurality of the photo-diodes 61 are two-dimensionally disposed in a matrix arrangement, and the vertical transfer unit 62 is disposed adjacent to the photo-diodes 61, parallel to rows extending in a vertical direction in FIG. 5. The vertical transfer unit 62 has four vertical transfer electrodes 62a, 62b, 62c and 62d, which correspond to each of the photo-diodes 61. Therefore, in the vertical transfer unit 62, four potential wells can be formed, so that a signal charge is output from the CCD 38 by controlling a depth of the wells, as is well-known. Note that a number of the vertical transfer electrodes can be changed, depending upon a requirement of the CCD 38.

The photo-diodes (PD) 61 and the vertical transfer unit (V-CCD, being a signal charge holding unit) 62 are disposed in a p-type well formed on a surface of the substrate 63. The p-type well is completely depleted due to an inverse-bias voltage applied between the p-type well and the n-type substrate 63. In this state, electric charge is accumulated in the photo-diodes 61, and an amount of the electric charge corresponds to an amount of an incident light beam, which is the reflected light beam reflected by the subject. When a substrate voltage is changed to a value greater than a predetermined value, electric charge accumulated in the photo-diodes 61 is discharged to the substrate 63. Conversely, when an electric charge transfer signal, which is a voltage signal, is applied to a transfer gate (TG) 64, the electric charge accumulated in the photo-diodes 61 is transferred to the vertical transfer unit 62. Namely, after the electric charge is discharged to the substrate 63 by the electric charge discharging signal, the signal charge accumulated in the photo-diodes 61 is transferred to the vertical transfer unit 62 by the electric charge transfer signal. By repeating the discharge and the transfer, an electronic shuttering operation is performed.

FIG. 7 is a timing chart of a distance information sensing operation by which data, corresponding to the distance from the camera body 10 to each point on a surface of the subject, is sensed. The distance information sensing operation is described below with reference to FIGS. 1, 2, 5, 6 and 7.

In synchronization with an output of a vertical synchronizing signal Si, an electric charge discharging signal (a pulse signal) S2 is output, so that unwanted charge, which is accumulated in the photo-diodes 61, is discharged to the substrate 63. Approximately simultaneously with a completion of the output of the electric charge discharging signal S2, the light emitting device 14 is actuated, and thus a distance measuring light beam S3, which is a pulsed beam having a constant pulse-width, is output therefrom. The distance measuring light beam S3 is reflected by the subject, and enters the CCD 38 as a reflected light beam S4. When a predetermined time has elapsed since the output of the distance measuring light beam S3, an electric charge transfer signal (pulse signal) S5 is output, so that an electric charge accumulated in the photo-diodes 61 is transferred to the vertical transfer unit 62. Note that the electric charge transfer signal S5 is output before the output of a pulse of the distance measuring light beam S3 is completed.

Thus, for a period $T_{U1}$ from the end of the output of the electric charge discharging signal S2 to the beginning of the output of the electric charge transfer signal S5, signal charge corresponding to distances from the camera body 10 to the subject is accumulated. Namely, although a period $T_S$, for which the distance measuring light beam S3 is output, and the electric charge accumulation period $T_{U1}$ begin approximately simultaneously, the electric charge accumulation period $T_{U1}$ ends prior to a completion of the period $T_S$, so that only a part of the reflected light beam S4 is detected by the CCD 38. Signal charge S6, generated due to the detected light beam, corresponds to the distance from the camera body 10 to the subject. In other words, the signal charge S6, corresponding to a light beam, which is included in the reflected light beam S4 coming from the subject and which reaches the photo-diodes 61 within the electric charge accumulation period $T_{U1}$ is accumulated in the photo-diodes 61. The signal charge S6 is transferred to the vertical transfer unit 62 by the electric charge transfer signal S5. Note that the period $T_S$, for which the distance measuring light beam S3 is output, can begin prior to the electric charge accumulation period $T_{U1}$, if necessary.

After a predetermined time has elapsed since the output of the electric charge transfer signal S5, the electric charge discharging signal S2 is again output, so that unwanted charge, which is accumulated in the photo-diodes 61 after the transfer of the signal charge S6 to the vertical transfer unit 62, is discharged to the substrate 63. Thus, further signal charge is accumulated in the photo-diodes 61. Then, similarly to the above description, when the electric charge accumulation period $T_{U1}$ has again elapsed, the signal charge S6 is transferred to the vertical transfer unit 62.

The transferring operation of the signal charge S6 to the vertical transfer unit 62 is repeatedly performed until the next vertical synchronizing signal S1 is output. Thus, the signal charge S6 is integrated in the vertical transfer unit 62. The signal charge S6 integrated for one field period, which is between two vertical synchronizing signals S1, corresponds to three-dimensional information of the subject, on condition that the subject is stationary for the period between the two vertical synchronizing signals S1.

The detecting operation of the signal charge S6 described above is carried out in all of the photo-diodes 61 provided in the CCD 38. As a result of the detecting operation for one field period, the three-dimensional information sensed by the photo-diodes 61 is held in each corresponding vertical transfer unit 62, which is located adjacent to each column of photo-diodes 61. The three-dimensional information is output from the CCD 38 by a vertical transferring operation of the vertical transfer units 62 and a horizontal transferring operation of a horizontal transfer unit (not shown).

Figure 8A:
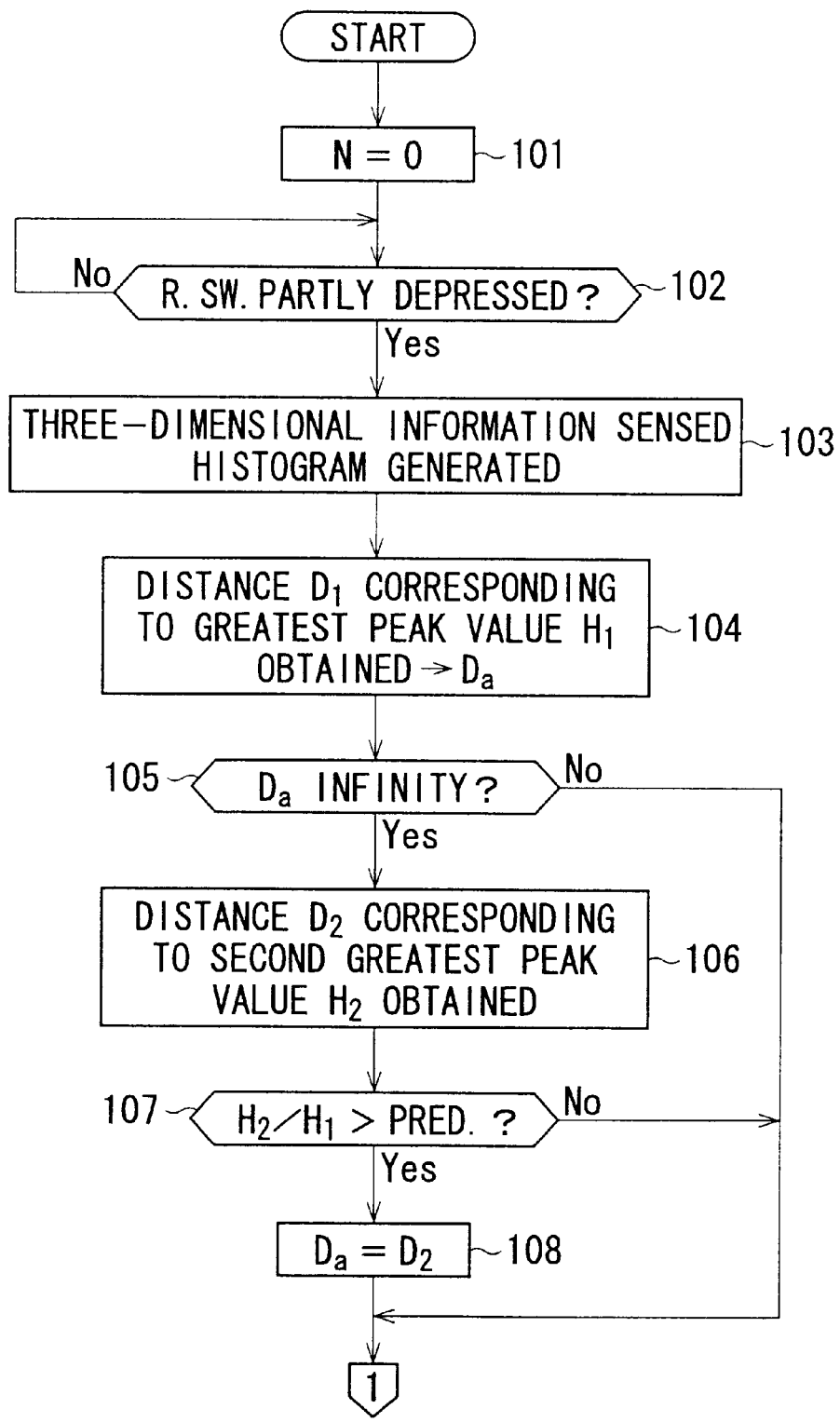
FIGS. 8A and 8B show a flowchart of a photographing operation routine executed in the first embodiment.
Figure 8B:
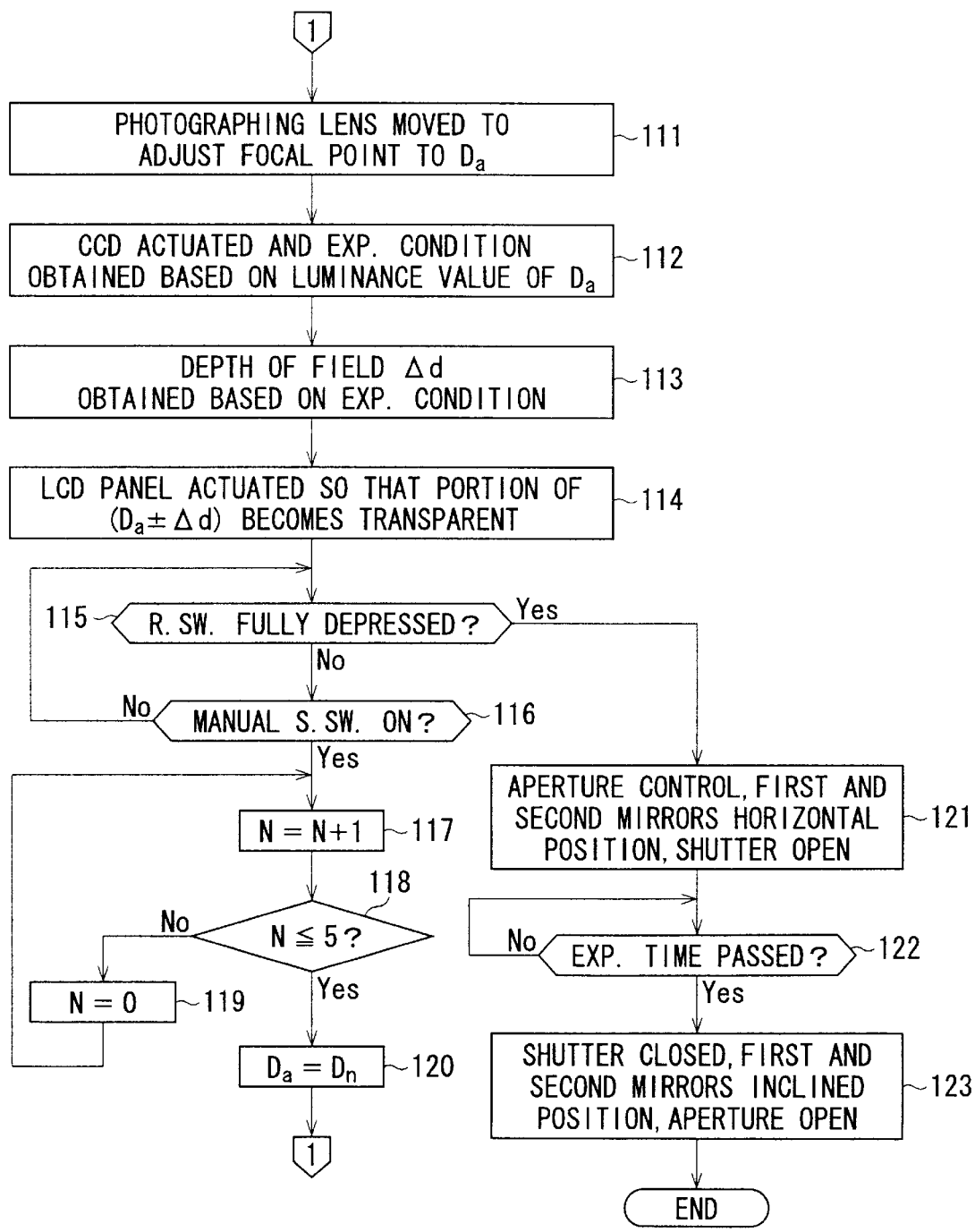

FIGS. 8A and 8B show a flowchart of a photographing operation routine in which a single subject is selected from a plurality of objects contained in an image to be photographed, and an automatic focusing control and an automatic exposure control are performed for the subject, using the principle of the distance measurement described above.

In Step 101, a parameter N is set to 0. In Step 102, it is determined whether the release switch 15 is partly depressed, i.e. whether a photometry switch is set to an ON state. When the release switch 15 is partly depressed, Step 103 is executed in which a distance measurement is carried out.

Figure 9:
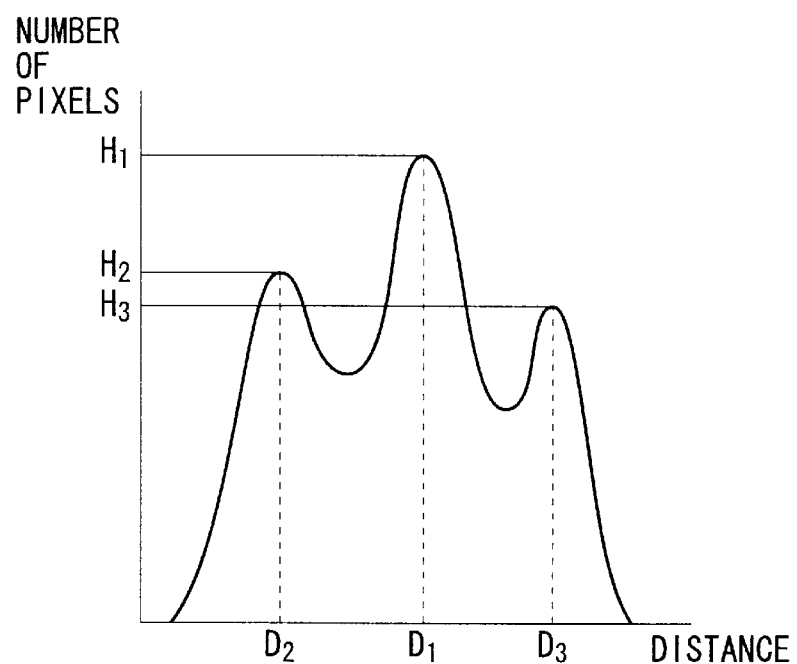
FIG. 9 is a histogram indicating a distribution of distances.

In Step 103, the light emitting device 14 and the CCD 38 are actuated, so that three-dimensional information is obtained regarding all of the objects contained in an image to be photographed. Namely, a distance from the camera to each point of the surfaces of the objects is sensed by each photo-diode of the CCD 38, and data indicating the distance is stored in the three-dimensional information memory 48. Further, in Step 103, based on the three-dimensional information, a histogram indicating a distribution of the distances, an example of which is shown in FIG. 9, is generated. In the histogram, the abscissa indicates a distance from the camera to each point of surfaces of the objects, and the ordinate indicates a number of pixels corresponding to the distance, i.e., a number of photo-diodes sensing the distance. In other words, the histogram indicates occurrences of the photo-diodes which output a signal of the distance.

In Step 104, a distance $D_1$, corresponding to a peak value $H_1$ having the greatest value in the histogram, is obtained, and is set to a significant distance Da corresponding to the subject which should be photographed or focused on. In Step 105, it is determined whether the significant distance Da is infinity, i.e. whether $1/Da \approx 0$. When the significant distance Da is infinity, i.e. when almost all portions of the image obtained by the CCD 38 correspond to infinite distance, it is deemed that the significant distance Da does not indicate the distance of the desired subject image of the photograph, and thus, the significant distance Da is again set in Steps 106 through 108.

In Step 106, a distance $D_2$, corresponding to a peak value $H_2$ having the second greatest value in the histogram, is obtained. In Step 107, it is determined whether a ratio $(H_2/H_1)$ is greater than a predetermined value (a value less than or equal to 1, for example). The ratio indicates a rate of an area of the subject image of the distance $D_2$ to an area of the background of the infinity, in the image which is to be photographed. When the ratio is greater than a predetermined value, it is deemed that the subject image to be photographed is positioned at the distance $D_2$, and in Step 108, the distance $D_2$ is set to the significant distance Da. Note that, in Step 107, it may be determined whether a ratio of the value $H_2$ (i.e., the number of pixels of distance $D_2$) to the number of all pixels of the image is greater than a predetermined value.

In Step 111, an automatic focusing control is performed for the subject to be photographed, so that the photographing lens 11 is moved along the optical axis thereof, and thus the focal point is adjusted to the significant distance Da. In Step 112, the CCD 38 is actuated, so that a luminance value of each pixel is sensed using photo-diodes corresponding to the significant distance Da. Further, the luminance values of the subject images to be photographed are integrated to perform a photometry, and thus an exposure condition, including an aperture value and a shutter speed, of the photographing operation is obtained. Namely, in Step 112, an automatic exposure control is performed. Thus, by obtaining a photometry signal based only on pixels corresponding to the predetermined subject contained in an image including a plurality of subjects, the optimum exposure condition of the subject can be obtained, so that an under-exposure and an over-exposure, which may be caused by a rear light, can be prevented.

Figure 10:
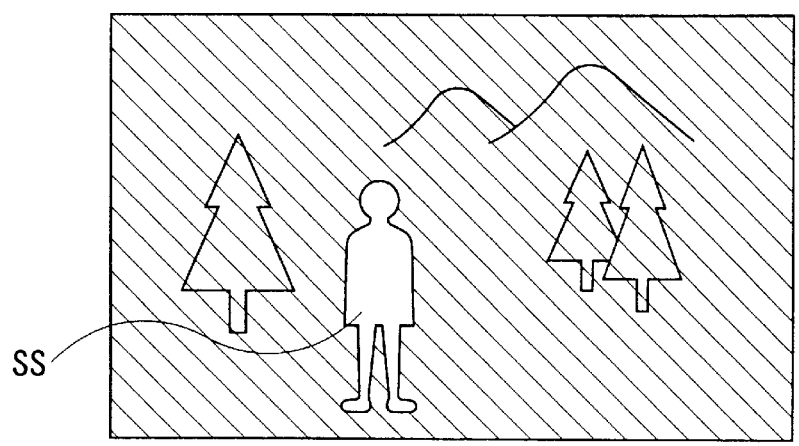
FIG. 10 is a view showing an example of an image frame observed through a viewfinder.

In Step 113, a depth of field $\Delta d$ is obtained based on the exposure condition (i.e., the significant distance Da, an aperture value, a focal length of the photographing lens 11, and so on) obtained in Step 112. In Step 114, the liquid crystal display panel 35 is actuated, and thus liquid crystal cells, corresponding to pixels in which distances are within a range of $(Da \pm \Delta d)$, are set to a transparent state, and the other liquid crystal cells are set to an opaque state. As a result, as shown in FIG. 10, the subject SS of the range $(Da \pm \Delta d)$ is a portion which is in focus, and is clearly observed through the viewfinder 33, while the other portion which is hatched becomes obscure. Accordingly, the photographer can easily recognize the subject SS, for which the focusing control and the exposure control are carried out.

In Step 115, it is determined whether the release switch 15 is fully depressed. When the release switch 15 is not fully depressed, Step 116 is executed, in which it is determined whether the manual selection switch 18 is set to an ON state. When the manual selection switch 18 is set to an OFF state, Steps 115 and 116 are repeatedly executed. When the release switch 15 is fully depressed, a photographing operation is carried out in Steps 121 through 123, and when the manual selection switch 18 is set to an ON state, the process goes to Step 117 so that the subject, for which a focusing control should be performed, is changed.

In Step 117, the parameter N is increased by one. In Step 118, it is determined whether the parameter N is less than or equal to 5, and when the parameter N is less than or equal to 5, Step 120 is executed. Namely, a distance Dn having the Nth greatest peak value in the histogram is newly set to the significant distance Da. Then, the process goes back to Step 111, the operations described above are performed regarding the new significant distance Da. Conversely, when it is determined in Step 118 that the parameter N exceeds 5, Step 119 is executed in which the parameter N is reset to 0, and the process goes back to Step 117. Thus, in this embodiment, the parameter can be set from 1 to 5.

On the other hand, in Step 121, the aperture 25 is driven from the fully open state to an opening degree corresponding to the exposure condition, and each of the first and second mirrors 31 and 32 is set to the horizontal position. Further, in Step 121, the shutter 41 is opened, so that the film 42 is exposed. In Step 122, it is determined whether the exposure time (i.e., shutter speed) set in Step 112 has been passed. When the exposure time has passed, Step 123 is executed, in which the shutter 41 is closed, the first and second mirrors 31 and 32 are set to the inclined positions, and the aperture 25 is returned to the fully open state. Thus, the program ends.

As described above, according to the embodiment, a subject, which should be in focus, is selected from a plurality of objects contained in a single image, with a simple operation in which a focus lock operation need not be performed. Namely, the subject, for which an focusing control and an exposure control should be performed, is selected exactly. Further, according to the embodiment, the subject, positioned in a range of the depth of field (Da+Δd), can be exactly recognized, without stopping down the aperture with a so-called pre-view operation.

FIG. 11 is a block diagram showing a digital camera to which a second embodiment of the present invention is applied. The basic constructions of the second embodiment are identical to those of the first embodiment shown in FIG. 2, and therefore, only the different constructions are described below.

The CCD 38 is disposed behind the photographing lens 11 to directly face the photographing lens 11, and no mirror and no shutter are provided, which is different from the first embodiment. An image memory 71 and an LCD drive circuit 72 are connected to the image signal process circuit 47, in addition to the three-dimensional information memory 48. While information, indicating a distance from the camera to a subject, is stored in the three-dimensional information memory 48, image data obtained by a photographing operation is stored in the image memory 71. On the other hand, a liquid crystal display monitor 73 is controlled by an LCD drive circuit 72, and can indicate a moving image obtained by the CCD 38. Thus, the liquid crystal display monitor 73 functions as a viewfinder. Further, the liquid crystal display monitor 73 can indicate a still image in accordance with the image data stored in the image memory 71.

A memory card controller 74 is connected to the system control circuit 51, and a memory card 75 can be attached to the memory card controller 74. The image data stored in the image memory 71 is transferred to the memory card 75 and recorded therein.

The remaining constructions are identical to those of the first embodiment.

Figure 12A:
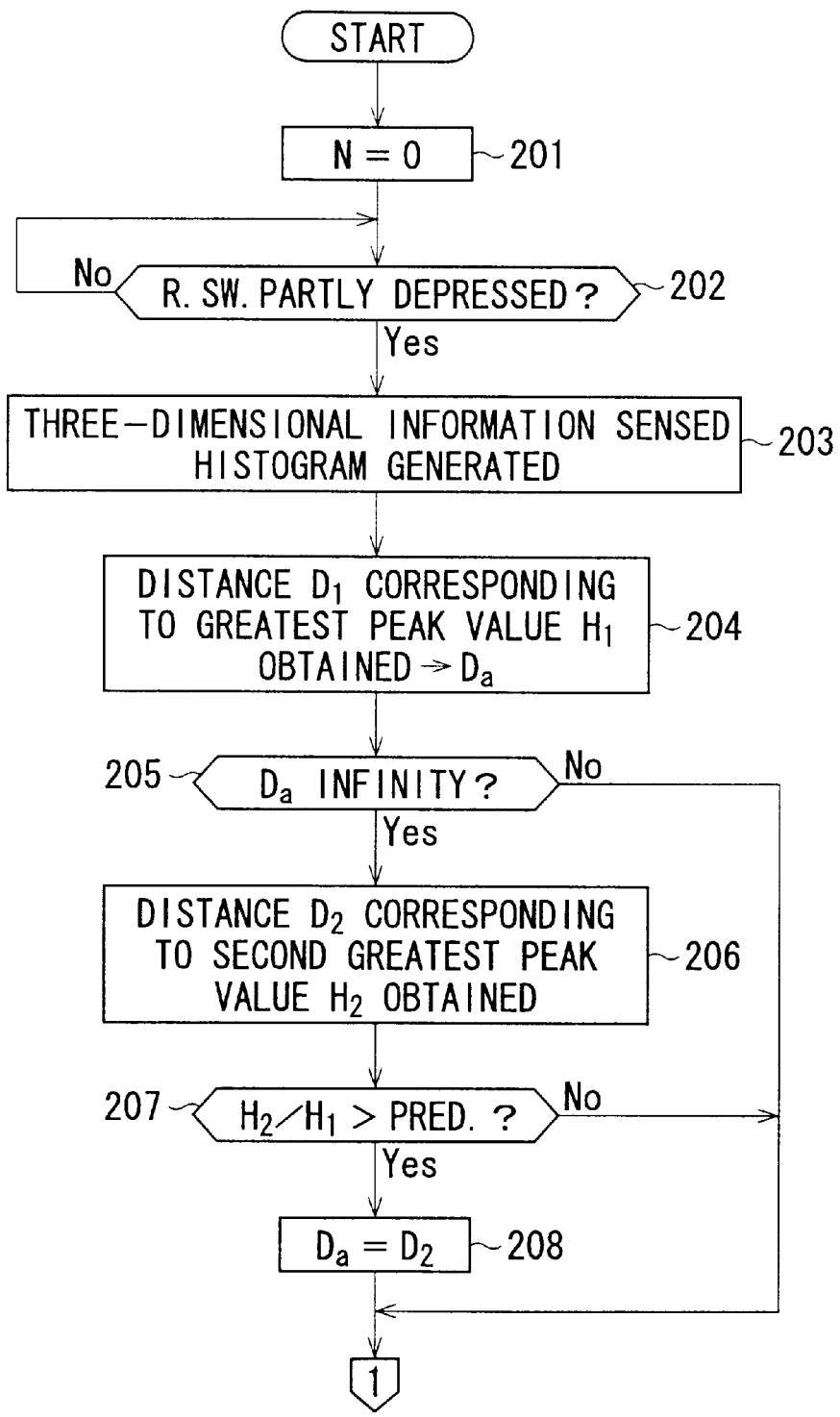
FIGS. 12A and 12B show a flowchart of a photographing operation routine executed in the second embodiment.
Figure 12B:
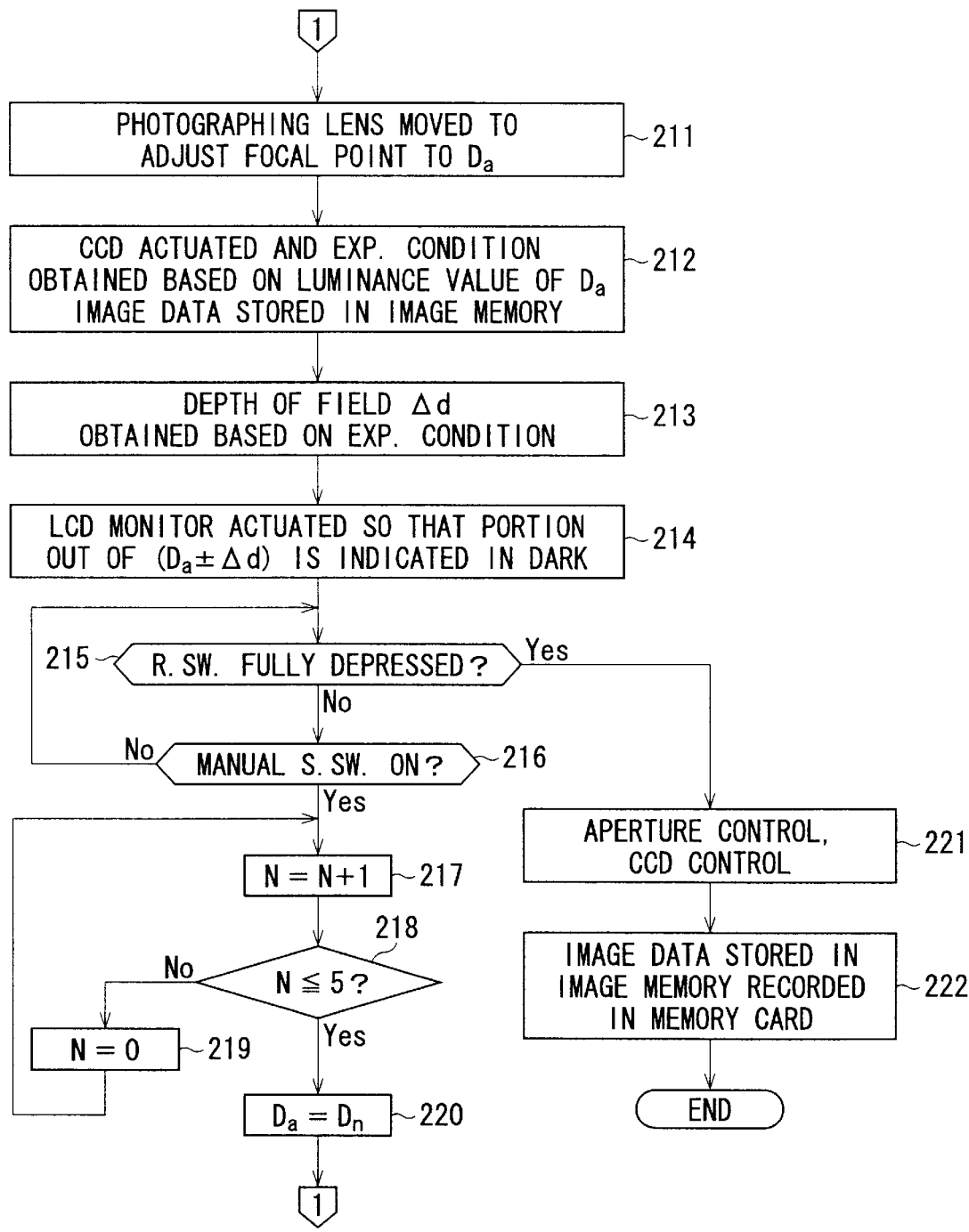

FIGS. 12A and 12B show a flowchart of a photographing operation routine of the second embodiment in which a single subject is selected and a photographing operation is performed.

The contents of Steps 201 through 208 are the same as those of Steps 101 through 108 shown in FIG. 8A. Namely, based on a histogram regarding three-dimensional information of a plurality of objects contained in a single image, a significant distance Da, which is a distance from the camera to the desired subject image to be photographed, is obtained.

In Step 211, an automatic focusing control is performed for the subject to be photographed, so that the photographing lens 11 is moved along the optical axis thereof, and thus the focal point is adjusted to the significant distance Da. In Step 212, the CCD 38 is actuated, so that a luminance value of each pixel is sensed using photo-diodes corresponding to the significant distance Da. Further, the luminance values of the subject are integrated to perform a photometry, and thus an exposure condition, including an aperture value and a shutter speed, of the photographing operation is obtained. Thus, by obtaining a photometry signal based only on pixels corresponding to the predetermined subject contained in an image including a plurality of subjects, the optimum exposure condition of the subject can be obtained, so that an under-exposure and an over-exposure, which may be caused by a rear light, can be prevented. In Step 212, image data obtained by all of the photo-diodes is stored in the image memory 71.

In Step 213, a depth of field Δd is obtained based on the exposure condition (i.e., the significant distance Da, an aperture value, a focal length of the photographing lens 11, and so on) obtained in Step 212. In Step 214, the liquid crystal display monitor 73 is actuated, and an area in which the distance is within a range of (Da±Δd), is indicated in a normal state, and the remaining area is indicated in a darker luminance due to an operation in which the luminance data of the image data is shifted by one bit. Accordingly, the photographer can easily recognize the subject, for which the focusing control and the exposure control have been carried out.

The contents of Steps 215 through 220 are the same as those of Steps 115 through 120 shown in FIG. 8B. Namely, by operating the manual selection switch 18, the subject, for which a focusing control should be performed, is manually selected, and when it is determined in Step 215 that the release switch 15 is fully depressed, the process goes to Step 221. Namely, the aperture 25 is driven from the fully open state to an opening degree corresponding to the exposure condition, and the CCD 38 is driven and exposed for a period corresponding to the shutter speed obtained in Step 212. Image data obtained in Step 221 is stored in the image memory 71, and then read from the image memory 71 and recorded in the memory card 75 in Step 222. Thus, the program ends.

As described above, the second embodiment is applied to the digital camera, and the same effects as the first embodiment, which is applied to a silver halide camera, are obtained.

Although the embodiments of the present invention have been described herein with reference to the accompanying drawings, obviously many modifications and changes may be made by those skilled in this art without departing from the scope of the invention.

The present disclosure relates to subject matter contained in each of Japanese Patent Application Nos. 10-297194 and 10-297243 (filed on Oct. 19, 1998) which are expressly incorporated herein, by reference, in their entireties.

What is claimed is:

1. A subject selection device for a camera, said device comprising:

a light source that radiates a distance measuring pulse light beam having a predetermined pulse width toward a plurality of objects to be photographed, each of said objects reflecting said distance measuring pulse light beam to generate a reflected light beam;

an imaging device that has a plurality of photoelectric conversion elements that detect a part of said reflected light beam, so that a signal charge corresponding to an amount of said detected reflected light beam is accumulated in each of said photoelectric conversion elements;

a three-dimensional information sensor that integrates said signal charge in each of said photoelectric conversion elements, whereby three-dimensional information indicating distances from said camera to points on a surface of each of said objects is obtained;

a histogram generator that generates a histogram indicating a distribution of said distances; and a subject selector that selects, based on said histogram, a subject of photography, from said objects, wherein said subject selector selects said subject based on a ratio of peak values included in said histogram.

2. A device according to claim 1, wherein said three-dimensional information sensor comprises:

a signal charge holder disposed adjacent to each of said photoelectric conversion elements;

an electric charge discharging processor that discharges unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holder; and a signal charge integrating processor that drives said electric charge discharging processor and said signal charge transfer processor alternately, so that said signal charge is integrated in said signal charge holder.

3. A device according to claim 2, wherein said photoelectric conversion elements are provided on a substrate, and said electric charge discharging processor discharges said unwanted charge to said substrate.

4. A device according to claim 2, wherein said signal charge holder is provided in a vertical transfer unit that outputs said signal charge from said three-dimensional information sensor.

5. A device according to claim 2, wherein said photoelectric conversion elements and said signal charge holders are formed as a vertical overflow drain type of interline CCD.

6. A device according to claim 2, wherein said electric charge discharging processor outputs an electric charge discharging signal to discharge said unwanted charge, and said signal charge transfer processor outputs an electric charge transfer signal to transfer said signal charge to said signal charge holder, said electric charge discharging signal and said electric charge transfer signal being pulse signals.

7. A device according to claim 6, wherein said light beam is output for an accumulating period, which commences at an output of said electric charge discharging signal and concludes at an output of said electric charge transfer signal, so that said signal charge corresponding to said three-dimensional information is integrated in said signal charge holder.

8. A device according to claim 1, wherein said subject selector selects said subject based on the larger peak value included in said histogram.

9. A device according to claim 1, wherein said subject selector selects one of said objects, corresponding to one of a plurality of peak values included in said histogram, as said subject.

10. A device according to claim 1, further comprising an automatic focusing adjustment processor that performs an automatic focusing adjustment for said subject.

11. A device according to claim 1, further comprising an automatic exposure control processor that performs an automatic exposure control for said subject.

12. An in-focus portion indicating device for a camera, said device comprising:

a light source that radiates a distance measuring pulse light beam having a predetermined pulse width toward an object to be photographed, said object reflecting said distance measuring pulse light beam to generate a reflected light beam;

an imaging device that has a plurality of photoelectric conversion elements that detect a part of said reflected light beam, so that a signal charge corresponding to an amount of said detected reflected light beam is accumulated in each of said photoelectric conversion elements;

a three-dimensional information sensor that integrates said signal charge in each of said photoelectric conversion elements, whereby three-dimensional information indicating distances from said camera to points on a surface of said object is obtained;

a histogram generator that generates a histogram indicating a distribution of said distances; and an in-focus portion indicator that indicates an in-focus portion of said object, based on a depth of field of said object and said histogram, wherein said in-focus portion indicator indicates said in-focus portion based on a ratio of peak values included in said histogram.

13. A device according to claim 12, wherein said three-dimensional information sensor comprises:

a signal charge holder disposed adjacent to each of said photoelectric conversion elements;

an electric charge discharging processor that discharges unwanted charge accumulated in each of said photoelectric conversion elements and allows an accumulating operation of signal charge in each of said photoelectric conversion elements;

a signal charge transfer processor that transfers said signal charge accumulated in said photoelectric conversion elements to said signal charge holder; and a signal charge integrating processor that drives said electric charge discharging processor and said signal charge transfer processor alternately, so that said signal charge is integrated in said signal charge holder.

14. A device according to claim 13, wherein said photoelectric conversion elements are provided on a substrate, and said electric charge discharging processor discharges said unwanted charge to said substrate.

15. A device according to claim 13, wherein said signal charge holder is provided in a vertical transfer unit that outputs said signal charge from said three-dimensional information sensor.

16. A device according to claim 13, wherein said photoelectric conversion elements and said signal charge holders are formed as a vertical overflow drain type of interline CCD.

17. A device according to claim 13, wherein said electric charge discharging processor outputs an electric charge discharging signal to discharge said unwanted charge, and said signal charge transfer processor outputs an electric charge transfer signal to transfer said signal charge to said signal charge holder, said electric charge discharging signal and said electric charge transfer signal being pulse signals.

18. A device according to claim 17, wherein said light beam is output for an accumulating period, which commences at an output of said electric charge discharging signal and concludes at an output of said electric charge transfer signal, so that said signal charge corresponding to said three-dimensional information is integrated in said signal charge holder.

19. A device according to claim 12, wherein said in-focus portion indicator indicates said in-focus portion based on the larger peak value included in said histogram.

20. A device according to claim 12, wherein said in-focus portion indicator indicates a portion, corresponding to one of a plurality of peak values included in said histogram, as said in-focus portion.

21. A device according to claim 12, wherein said in-focus portion indicator comprises a liquid crystal monitor, which indicates said in-focus portion with a luminance which is different from other portions.

22. A device according to claim 12, wherein said in-focus portion indicator comprises a liquid crystal display panel provided in an optical path of an optical view finder of said camera, said liquid crystal display panel being controlled in such a manner that said in-focus portion is in a transparent state.

\* \* \* \* \*